United States Patent
Park

Patent Number: 5,935,678
Date of Patent: *Aug. 10, 1999

[54] BALLISTIC LAMINATE STRUCTURE IN SHEET FORM

[76] Inventor: Andrew D. Park, 2851 E. Brigstock Rd., Midlothian, Va. 23113

[*] Notice: This patent is subject to a terminal disclaimer.

[21] Appl. No.: 08/850,593

[22] Filed: May 2, 1997

Related U.S. Application Data

[63] Continuation-in-part of application No. 08/506,991, Jul. 28, 1995, Pat. No. 5,635,288, which is a continuation-in-part of application No. 08/243,976, May 17, 1994, Pat. No. 5,437,905.

[51] Int. Cl.⁶ ......................................................... B32B 5/12
[52] U.S. Cl. .......................... 428/105; 428/113; 428/408; 428/902; 428/911; 2/2.5
[58] Field of Search ..................................... 428/105, 113, 428/408, 902, 911; 2/2.5

[56] References Cited

U.S. PATENT DOCUMENTS

| | | |
|---|---|---|
| 3,322,613 | 5/1967 | Rasmussen et al. |
| 3,439,865 | 4/1969 | Port et al. |
| 3,719,545 | 3/1973 | Lawler |
| 4,079,161 | 3/1978 | Kile |
| 4,090,005 | 5/1978 | Morgan |
| 4,181,768 | 1/1980 | Severin |
| 4,186,648 | 2/1980 | Clausen et al. |
| 4,213,812 | 7/1980 | Boultinghouse |
| 4,309,487 | 1/1982 | Holmes |
| 4,428,998 | 1/1984 | Hawkinson |
| 4,466,135 | 8/1984 | Coppage, Jr., |
| 4,510,200 | 4/1985 | Samowich |
| 4,678,702 | 7/1987 | Lancaster et al. |
| 4,916,000 | 4/1990 | Li et al. |
| 4,953,234 | 9/1990 | Li et al. |
| 5,173,138 | 12/1992 | Blauch et al. |

FOREIGN PATENT DOCUMENTS

| | | |
|---|---|---|
| 0 169 432 | 1/1986 | European Pat. Off. |
| 0 572 965 A1 | 12/1993 | European Pat. Off. |
| 0 683 374 A1 | 11/1995 | European Pat. Off. |
| WO 94/09336 A1 | 4/1994 | WIPO |

OTHER PUBLICATIONS

Nonwovens Industry, Technical Nonwovens, Biting the Bullet: New Nonwoven Finding Application in Ballistic Protection; Apr., 1991; all submitted pages; Nonwovens Industry.

Congress Of The United States Office Of Technology Assessment; Police Body Armor Standards and Testing; vol. 1: Report; no date provided; all submitted pages; vol 1; United States Government; U.S.A.; Office of Technology Assessment.

*Primary Examiner*—Rich Weisberger
*Attorney, Agent, or Firm*—Adams Law Firm, P.A.

[57] ABSTRACT

A ballistic laminate structure in sheet form includes first and second arrays of high performance, unidirectionally-oriented fiber bundles having a tensile strength greater than 7 grams per denier. The second array of fiber bundles is cross-plied at an angle to the first array of fiber bundles. A polymeric film resides between the first and second cross-plied arrays of fiber bundles to adhere the first and second arrays of fiber bundles together without substantial penetration of the film into the fiber bundles or through the laminate structure from one side to the other.

11 Claims, 9 Drawing Sheets

BALLISTIC LAMINATE STRUCTURE IN SHEET FORM

This application is a continuation-in-part of U.S. Ser. No. 08/506,991, filed on Jul. 28, 1995, now U.S. Pat. No. 5,635,288, which is a continuation-in-part of U.S. Ser. No. 08/243,976, filed on May 17, 1994, and issued as U.S. Pat. No. 5,437,905. The invention relates to a ballistic laminate structure in sheet form, a ballistic panel constructed of a plurality of the sheets, a ballistic garment constructed of one or more of the ballistic panels, and a method of fabricating a ballistic laminate structure, and a ballistic resistant composite for hard-armor application.

TECHNICAL FIELD AND BACKGROUND OF THE INVENTION

Numerous ballistic laminates are known, for example, those disclosed in U.S. Pat. Nos. 4,916,000, 4,079,161, 4,309,487, and 4,213,812. Prior art laminates have been constructed of numerous fibers, including polyethylene, polyolefin and aramid fibers. Many such prior art laminates are woven of various fibers, such as aramid fibers sold under the trademark "Kevlar".

A ballistic non-woven laminate referred to by the trademark "Spectra-Shield" is manufactured by Allied-Signal, Inc. The laminate structure is used in soft body armor to protect the wearer against high-velocity bullets and fragments. "Spectra-Shield" is made by first forming a nonwoven unidirectional tape, composed of unidirectional polyethylene fibers and an elastic resin material that holds the fibers together. The resin penetrates to the filament level, impregnating the entire structure with the resin product. Two layers, or arrays, of the unidirectional tape are then laminated together (cross-plied) at right angles to form a panel. Then, the panel is covered on both sides with a thin film of polyethylene on the order of 0.001 inches thick. The film prevents adjacent panels from sticking together when the panels are layered together in the soft body armor.

The present invention relates to an improved non-woven ballistic laminate structure. Enhanced anti-ballistic characteristics are obtained while optimizing use of materials in the laminate. Specifically, it has been determined that ballistic laminates can be constructed of high performance fibers without using resins to hold the fibers together. This substantially reduces the weight of the structure without compromising the anti-ballistic characteristics of the structure. As used in this application, the term "high performance fiber" refers to fibers having a tensile strength greater than 7 grams per denier.

By omitting the resin, the cross-plied arrays of fibers directly contact each other, instead of being encapsulated and therefore separated from each other by the resin. An ultra-thin film is used both to cover the cross-plied arrays and to hold the arrays to each other.

The prior art teaches that a critical limit of 80% fiber must be maintained in the laminate in order to maintain product integrity. If the percentage of resin, covers and the like exceeds 20%, the anti-ballistic qualities of the laminate begin to degrade.

This invention incorporates certain features heretofore recognized as being only applicable to older, low performance fibers into the field of high performance fibers in order to achieve a ballistic laminate structure with enhanced anti-ballistic characteristics.

SUMMARY OF THE INVENTION

Therefore, it is an object of the invention to provide a ballistic laminate structure in sheet form which includes a first array of high performance, unidirectionally-oriented fiber bundles and a second array of high performance, unidirectionally-oriented fiber bundles cross-plied at an angle with respect to the first array of fiber bundles, and laminated to the array of fiber bundles in the absence of adhesives or bonding agents. First and second thermoplastic films are bonded to outer surfaces of the laminated first and second arrays of unidirectional fiber bundles without penetration of the films into fiber bundles or through the laminate from one side to the other.

According to one preferred embodiment of the invention, the high-performance fiber is chosen from the group consisting of aramid fiber, polyolefins such as ultra high molecular weight polyethylene and high molecular weight polyethylene, high modulus vinylon, and liquid crystal polymer-based fiber.

According to another preferred embodiment of the invention, the first array of fiber bundles is cross-plied at an angle of 90 degrees to the second array of fiber bundles.

According to yet another preferred embodiment of the invention, the first and second thermoplastic films comprise polyethylene film having a thickness of 0.35 mils.

According to yet another preferred embodiment of the invention, the percentage by weight of the high performance fibers in the ballistic laminate structure is at least 80 percent of the total weight of the ballistic laminate structure.

According to yet another preferred embodiment of the invention, a ballistic laminate structure is provided, and includes a first array of high performance, unidirectionally-oriented aramid fiber bundles and a second array of high performance, unidirectionally-oriented aramid fiber bundles cross-plied at right angles with respect to the first array of fiber bundles, and laminated to the first array of fiber bundles in the absence of adhesives or bonding agents. First and second polyethylene films, each film having a thickness of 0.35 mils, are bonded to the outer surfaces of the laminated first and second arrays of unidirectional fibers without penetration of the films into fiber bundles or through the laminate from one sheet of fibers to the other.

According to yet another preferred embodiment of the invention, each of the aramid fiber arrays has 10 bundles per inch of 840 denier, 1.5 denier per filament fiber.

A ballistic panel is constructed of ballistic laminate structures according to the invention. A panel for preventing penetration of hand gun rounds contains at least 10 sheets of the ballistic laminate structure.

A ballistic panel for preventing penetration of high velocity rifle rounds contains at least 40 sheets of the ballistic laminate structure.

According to yet another preferred embodiment of the invention, the ballistic panel includes a fabric envelope within which the ballistic laminate structure sheets are contained.

An armored garment according to the present invention includes at least one ballistic panel according to the invention contained within a supporting structure for being worn on a body part.

According to yet another preferred embodiment of the invention, the armored garment includes a panel for preventing penetration of hand gun rounds, and contains at least 10 and no more than 60 sheets of the ballistic laminate structure.

According to yet another preferred embodiment of the invention, the armored garment includes a panel for preventing penetration of high velocity rifle rounds containing at least 40 and no more than 150 sheets of the ballistic laminate structure.

According to yet another preferred embodiment of the invention, the armored garment includes a fabric envelope within which the ballistic laminate structure sheets are contained.

An embodiment of the method of fabricating a ballistic laminate structure in sheet form according to the invention comprises the steps of forming a first array of high performance, unidirectionally-oriented fiber bundles, forming a second array of high performance, unidirectionally-oriented fiber bundles, and cross-plying the second array of fiber bundles at an angle with respect to the first array of fiber bundles. Films are bonded to respective opposing outer surfaces of the laminated first and second arrays of unidirectional fiber bundles without penetration of the films into fiber bundles or through the laminate from one side of the ballistic laminate structure to the other.

A ballistic resistant composite for hard-armor application includes a rigid plate, and a ballistic laminate structure supported by the plate. The laminate structure includes first and second arrays of high performance, unidirectionally-oriented fiber bundles. The second array of high performance, unidirectionally-oriented fiber bundles is cross-plied at an angle with respect to the first array of fiber bundles, and is laminated to the first array of fiber bundles in the absence of adhesives or bonding agents.

Preferably, the first and second arrays of high performance, unidirectionally-oriented fiber bundles include fibers chosen from the group consisting of aramid fiber, polyolefins such as ultra high molecular weight polyethylene and high molecular weight polyethylene, high modulus vinylon, and liquid crystal polymer-based fiber.

First and second polymeric films are bonded to outer surfaces of the laminated first and second arrays of unidirectional fiber bundles without penetration of the films into the fiber bundles or through the laminate from one side to the other. Thus, a sufficient amount of film resides between the laminated first and second arrays of unidirectional fiber bundles to adhere the first and second arrays of fiber bundles together to form the ballistic laminate structure.

According to one preferred embodiment of the invention, the rigid plate includes a material selected from the group consisting of ceramic, steel, glass, aluminum, titanium, and graphite.

According to another preferred embodiment of the invention, the rigid plate further includes a thermoset polymeric resin.

According to yet another preferred embodiment of the invention, an adhesive material is provided for adhering the ballistic laminate structure to the rigid plate.

Preferably, the adhesive material is an epoxy resin. However, other suitable commercially available adhesive or bonding resins may be used.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
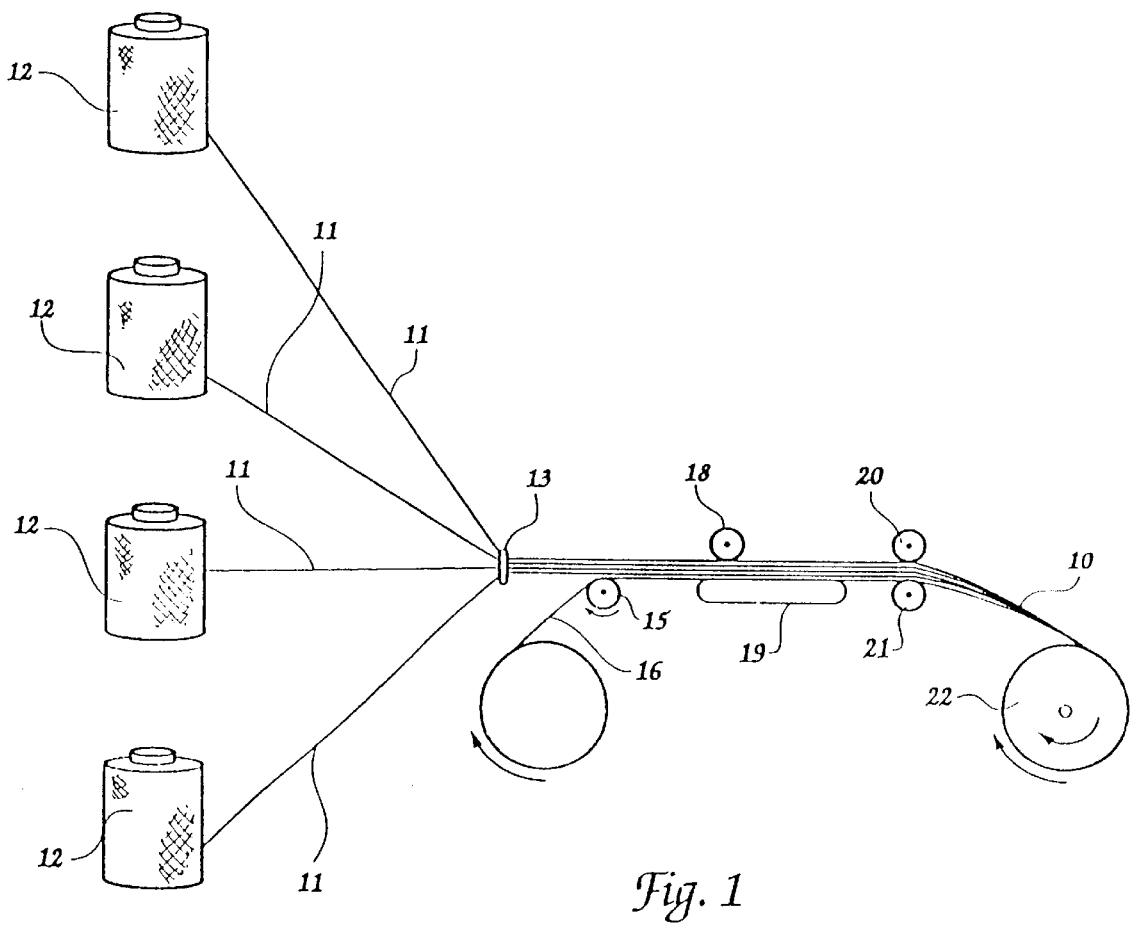
FIG. 1 is a simplified flow diagram of the process of fabricating the ballistic laminate in sheet form according to a preferred embodiment of the invention.

Referring now specifically to the drawings, a ballistic laminate structure in sheet form according to the present invention is illustrated in FIG. 1 and shown generally at reference numeral 10. The sheet 10 is created according to the process illustrated in FIG. 1. A plurality of bundles 11 of untwisted high performance fibers are formed into an array. The bundles 11 may be supplied from separate creeled yarn packages 12, as shown in FIG. 1, or may be supplied from a warp beam (not shown). The fibers in the bundles 11 are unidirectional, and the bundles are passed through a comb guide 13 where the fiber bundles 11 are further parallelized and formed into an array having a predetermined uniform number of bundles per inch of width. A single layer of fiber bundles 11 are arrayed and then passed over a film application roller 15 where a thin polyethylene film 16 is applied to one side of the array of fiber bundles 11. A pre-lamination roller 18 presses the array of fiber bundles 11 onto the film 16, which is supported on a heated platen 19. After heating, the fiber bundles 11 and the attached film 16 are laminated by passing them through a pair of heated nip rolls 20, 21. The assembled laminate structure is then wound onto a take-up beam 22.

Figure 2:
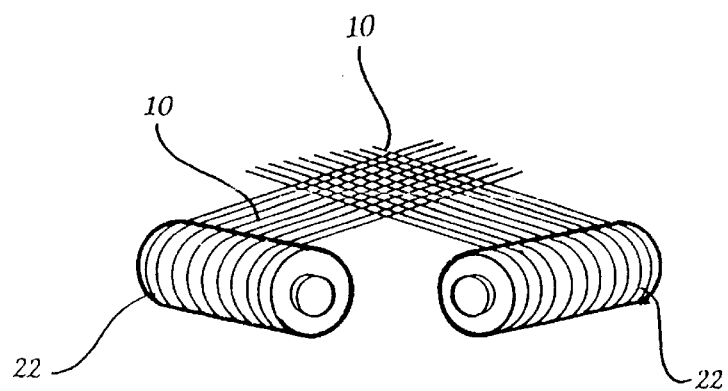
FIG. 2 illustrates formation of the laminate structure from two identical laminate sheets.
Figure 3:
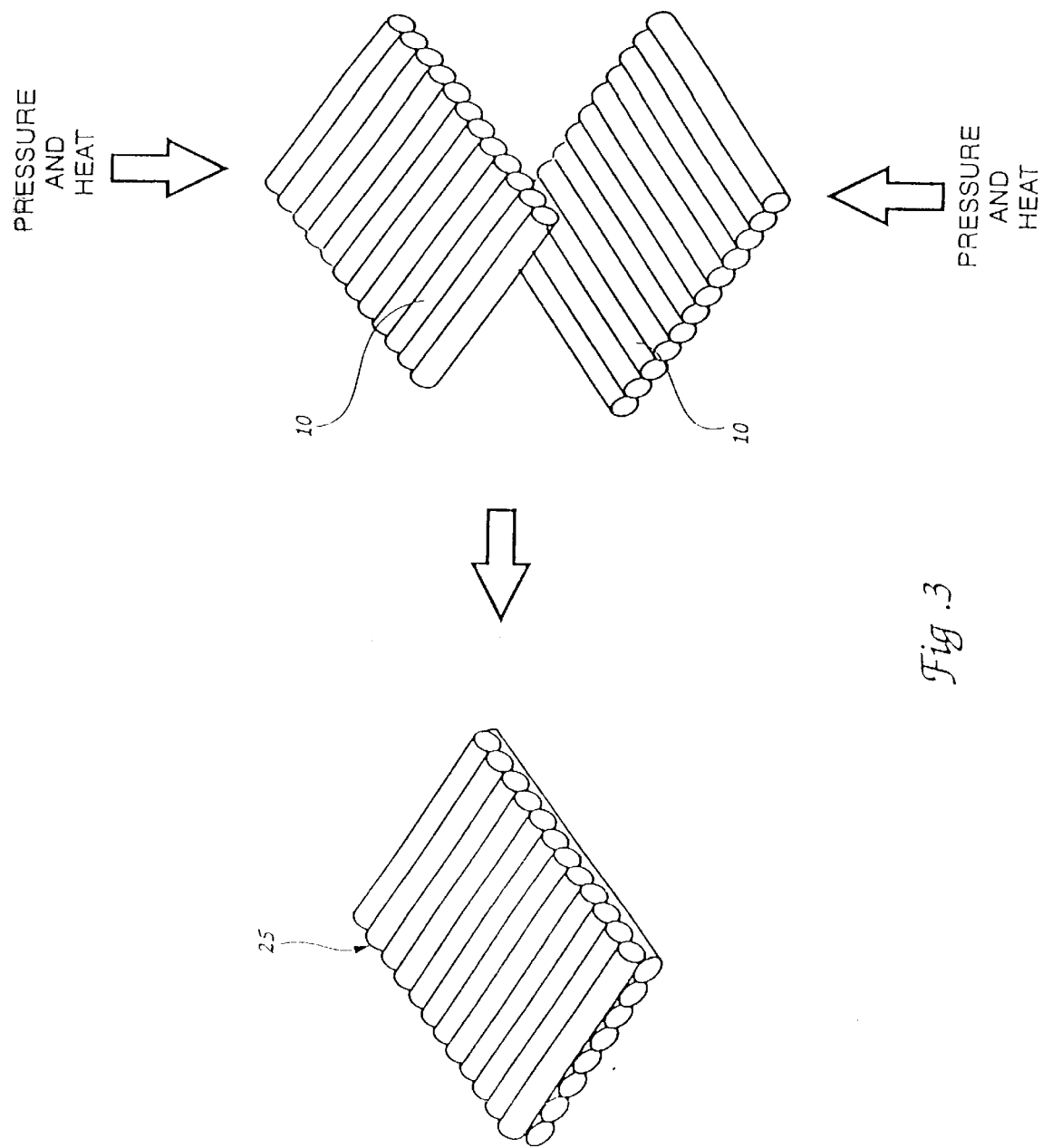
FIG. 3 further illustrates formation of the laminate structure from two identical laminate sheets.

Referring now to FIG. 2, two layers, or plies, of the sheet 10 are bonded to each other with the direction of the fiber bundles at 90 degree angles to each other. Other cross ply angles are possible, such as 45°. The sheets 10 are layered with the respective polyethylene films 16 on the outside, so that substantially uncoated high performance fibers are in contact with each other. As is illustrated in FIG. 3, bonding occurs by further heating the sheets 10 so that the films 16 remelt. The films 16 are extremely thin, on the order of about 0.25–1.0 mil and most preferably about 0.35 mil, so that the films 16 will slightly coat the exterior surfaces of the individual fiber bundles 11, but will not penetrate into the fiber bundles 11 so as to coat and encapsulate the individual fibers and filaments. Sufficient plasticized film material 16 flows between the adjacent cross-plied arrays of fiber bundles 11 to bond the two sheets 10 of fiber bundles together to form a ballistic laminate structure 25.

The percent ratio by weight of high performance fibers to film in the laminate structure 25 is preferably equal to or greater than 80:20. When the fiber weight drops below 80% of the overall weight of the laminate structure 25, the anti-ballistic qualities of the laminate structure 25 begin to degrade.

Figure 4:
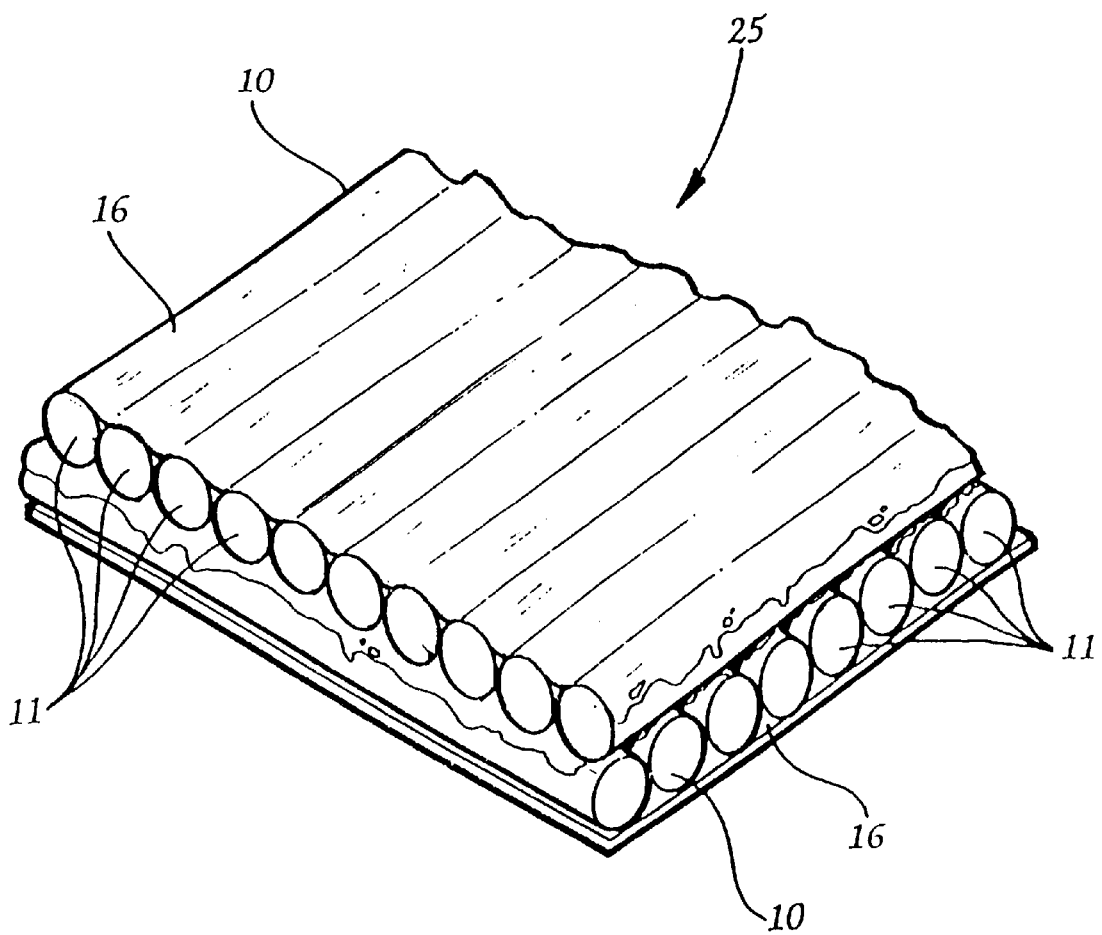
FIG. 4 is an enlarged, diagrammatic representation of the interaction of the thin covering films and the unidirectional fiber arrays of the laminate structure.

As shown in FIG. 4, the fiber bundles 11 of each of the sheets 10 are at right angles to each other. The outer surface of each of the sheets 10 are coated with the film 16. As is illustrated, the film 16 has melted and flowed into the interstices between the fiber bundles 11 of each of the sheets 10. Sufficient melted polyethylene from both of the films 16 have intermingled with each other and coated the outer surface of the fiber bundles of the other sheet 10 to create a surface bond to hold the two sheets 10 together to form the laminate structure 25.

Figure 5:
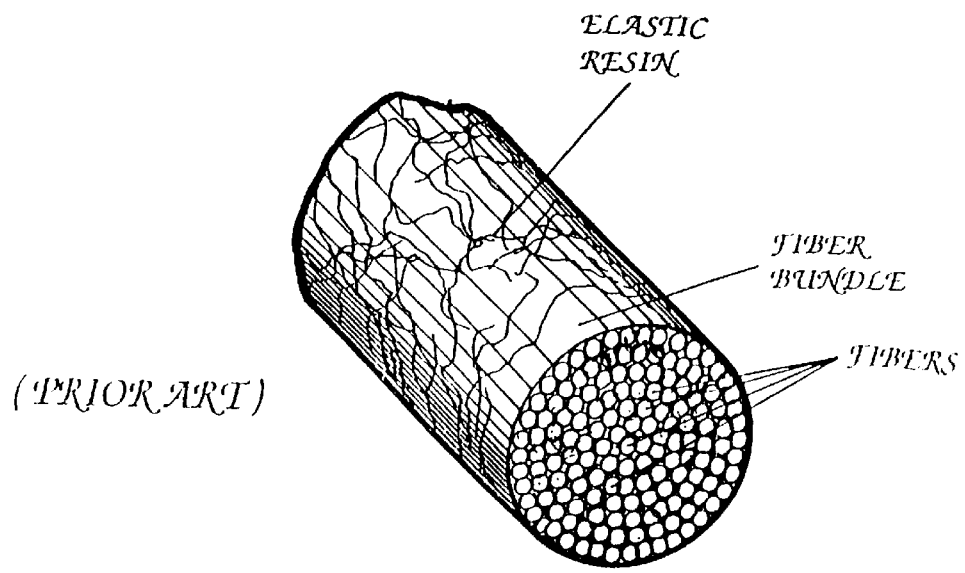
FIG. 5 is an enlarged view of a single fiber bundle according to the prior art, showing complete impregnation of the resin into the structure of the fiber bundle.
Figure 6:
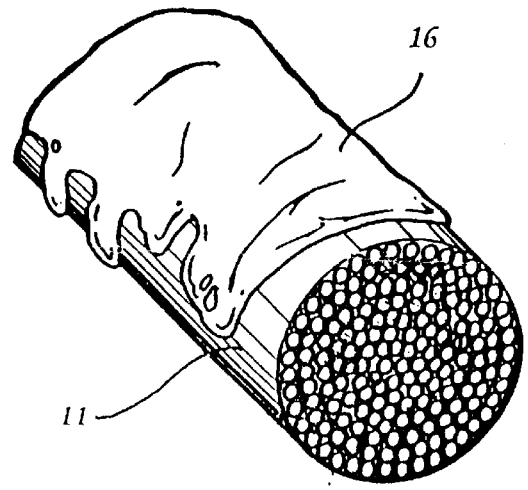
FIG. 6 is a enlarged view of a single fiber bundle according to an embodiment of the invention showing lack of impregnation of the resin into the structure of the fiber bundle.

This is illustrated more clearly in FIGS. 5 and 6. FIG. 5 shows a prior art construction such as a "Spectra-Shield" product using both an elastic resin and a surface film. The individual fiber bundles and the individual fibers which make up the bundle are substantially completely encapsulated with the elastic resin (the black, surrounding material) as well as the outside of the fiber bundle. This adds to the weight of the product and creates the possibility of variation in quality if too much or too little resin is used, or if the resin is applied unevenly or inconsistently.

In contrast, the fiber bundles 11 according to the present invention are coated by the film 16 on the outside surface only, so that the integral structure of parallel, closely bunched filaments and fibers remains intact, and intimate contact between the closely bunched filaments and fibers remains. The film 16 may not even coat the entire outer surface of the fiber bundle 11, but only to a sufficient degree to properly bond the two sheets 10 together to form the laminate structure 25. This is also illustrated in FIG. 4.

Although the films 16 of the laminate structure 25 are preferably formed of polyethylene, other polymeric materials such as thermosetting plastics, thermoplastics, or elastomerics may be used. In the case of thermosetting plastics, the film 16 is not fully cured prior to formation of the laminate structure 25. Thus, in its partially cured state, sufficient plasticized film material 16 flows between the adjacent cross-plied arrays of fiber bundles 11 to bond the two fiber bundles 11 together to form a ballistic laminate structure 25. The amount of heat and pressure required during lamination is a function of the duration of the lamination process, and the thickness and other properties of the film 16 being used.

According to another embodiment, a film-coated sheet 10 may be cross-plied and laminated with a sheet that does not include a film coating. In this case, the plasticized film 16 flowing from the coated array of fiber bundles to the uncoated array of fiber bundles is sufficient to bond the two sheets together to form a modified ballistic laminate structure. Alternatively, the laminate structure may be formed by sandwiching a film layer between two uncoated sheets of high performance fibers, or between two coated sheets of high performance fibers.

A preferred embodiment of the laminate structure is given in the following example:
  Fiber—"Kevlar" aramid fiber
  Fiber construction—840 denier, 1.5 den/fil. per tow.
  Sheet Construction—10 ends/inch unidirectional untwisted tows Number of Sheets in laminate structure—2
  Sheet orientation of 1st and 2nd sheets—90 degrees
  Film—0.35 mil polyethylene Laminate structure—intimately plied sheets with overlying, surface-applied polyethylene film Percentage of fiber weight to film weight—80%

Figure 7:
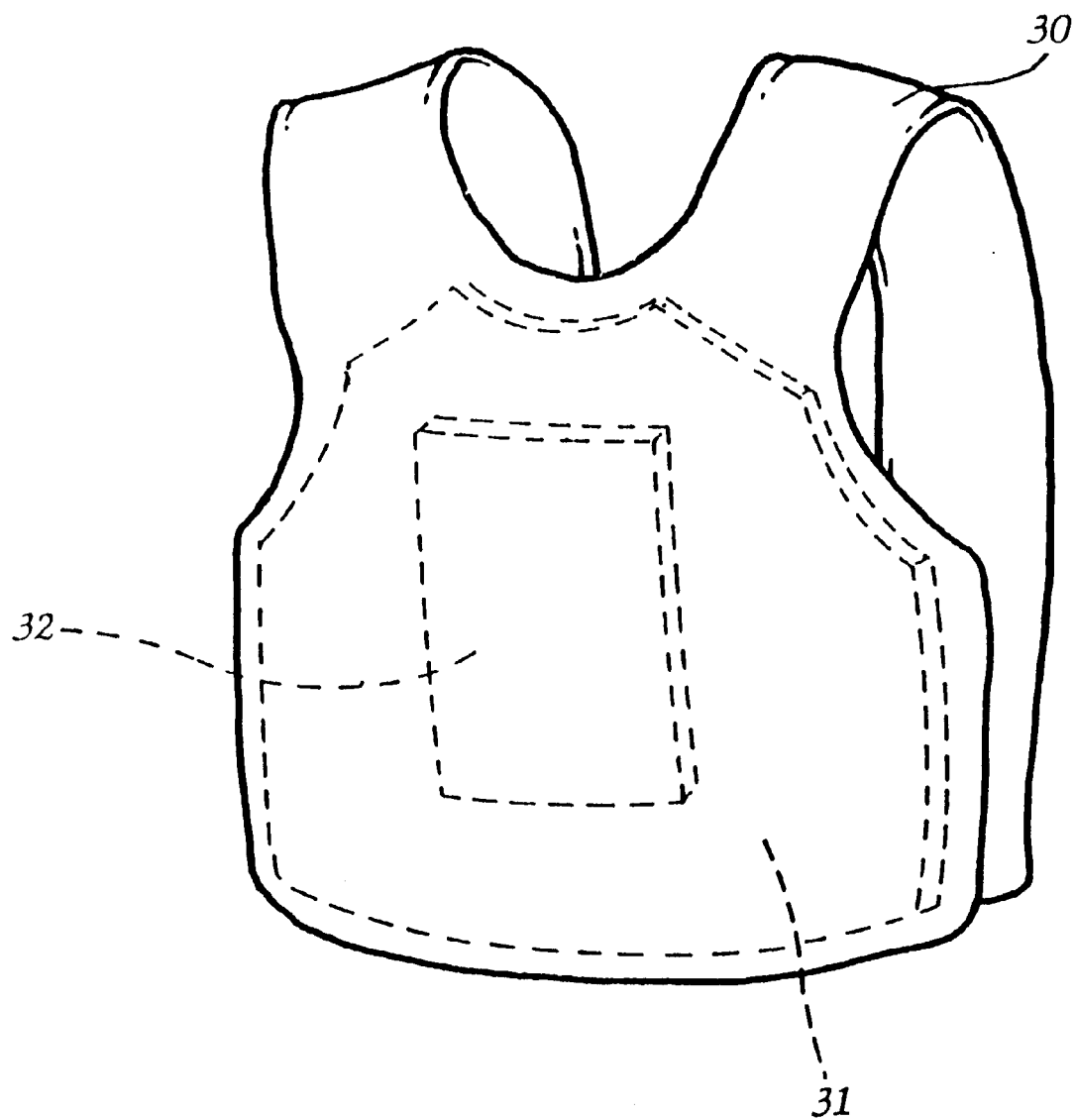
FIG. 7 is an armored body garment according to a preferred embodiment of the invention.

The laminate structure 25 must be used in multiple layers to form a ballistic panel for incorporation into a garment. Referring to FIG. 7, a ballistic garment 30 is illustrated. The garment 30 incorporates two protective ballistic panels. A first panel 31 is formed of multiple layers of laminate structures 25. A panel 31 for preventing penetration of conventional rifle rounds contains at least 10 and no more than 40 sheets of the ballistic laminate structure 25. A panel 31 for preventing penetration of hand gun rounds contains at least 40 and no more than 80 sheets of the ballistic laminate structure 25. Adequate protection from extremely high powered rifles or rifles firing steel core and/or steel jacketed rounds may require up to 150 layers. The laminate structures 25 are not bound together in any way, but are overlaid in substantial registration with each other and placed in an envelope or pocket formed in the garment 30.

As is shown in FIG. 7, the panel 31 is relatively large and covers substantially the entire thorax region of the wearer. A smaller panel 32, which may contain the same, a lesser, or a greater number of laminate structures 25, is placed over the larger panel 31 in a separate pocket or envelope and provides additional protection to vital organs such as the heart and lungs. The garment 30 is illustrative of many types of garments which can incorporate panels formed of layers of the laminate structure 25 disclosed in this application.

Figure 8:
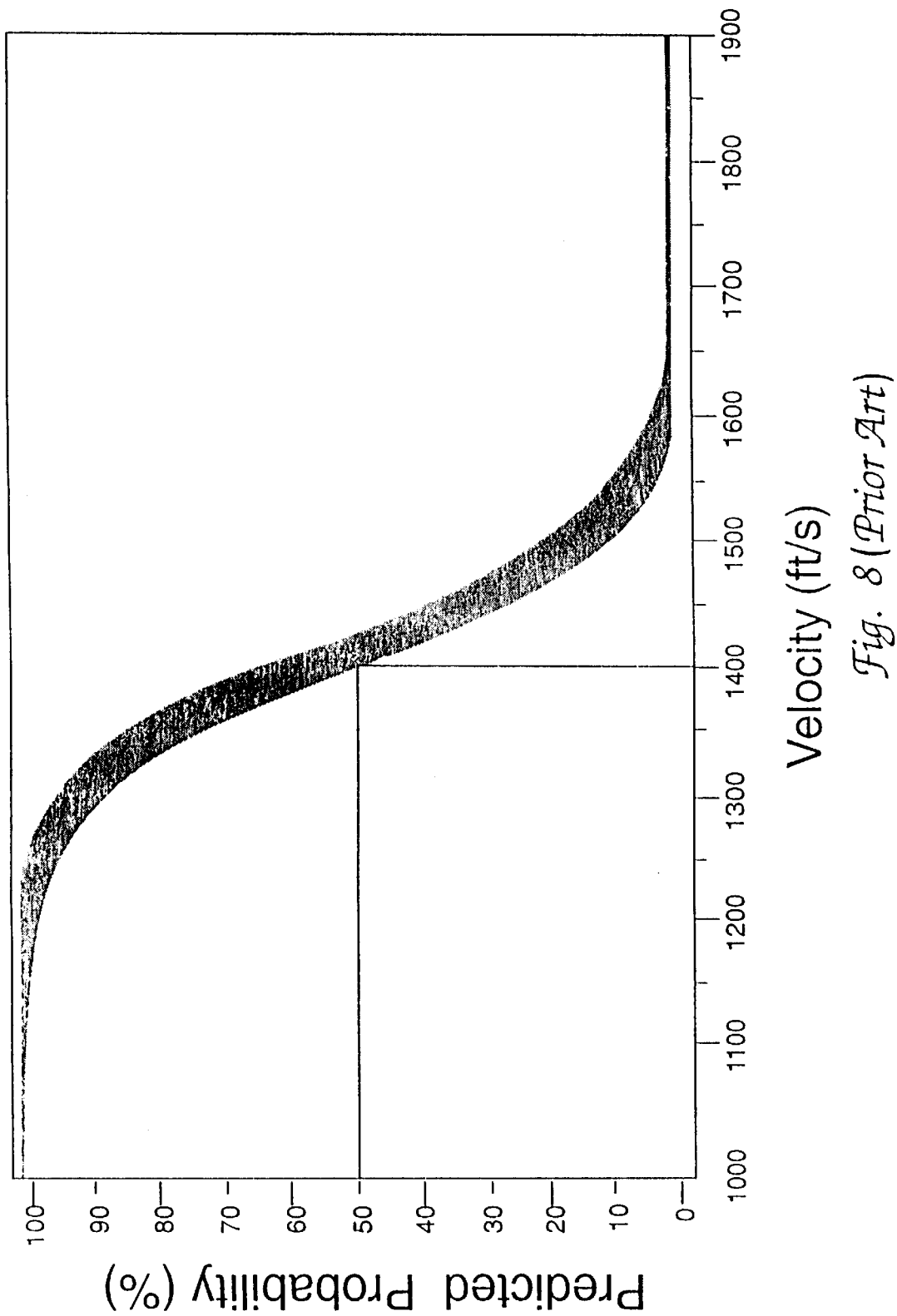
FIG. 8 is a table showing estimated stopping ability of a prior art aramid ("Kevlar") fabric.

Referring now to FIG. 8, the graph illustrates that at the 50% predicted probability level, a standard measure of ballistic efficiency, a prior art fabric constructed of "Kevlar 129" fiber will stop a 9 mm round of ammunition traveling at 1400 ft/sec.

Figure 9:
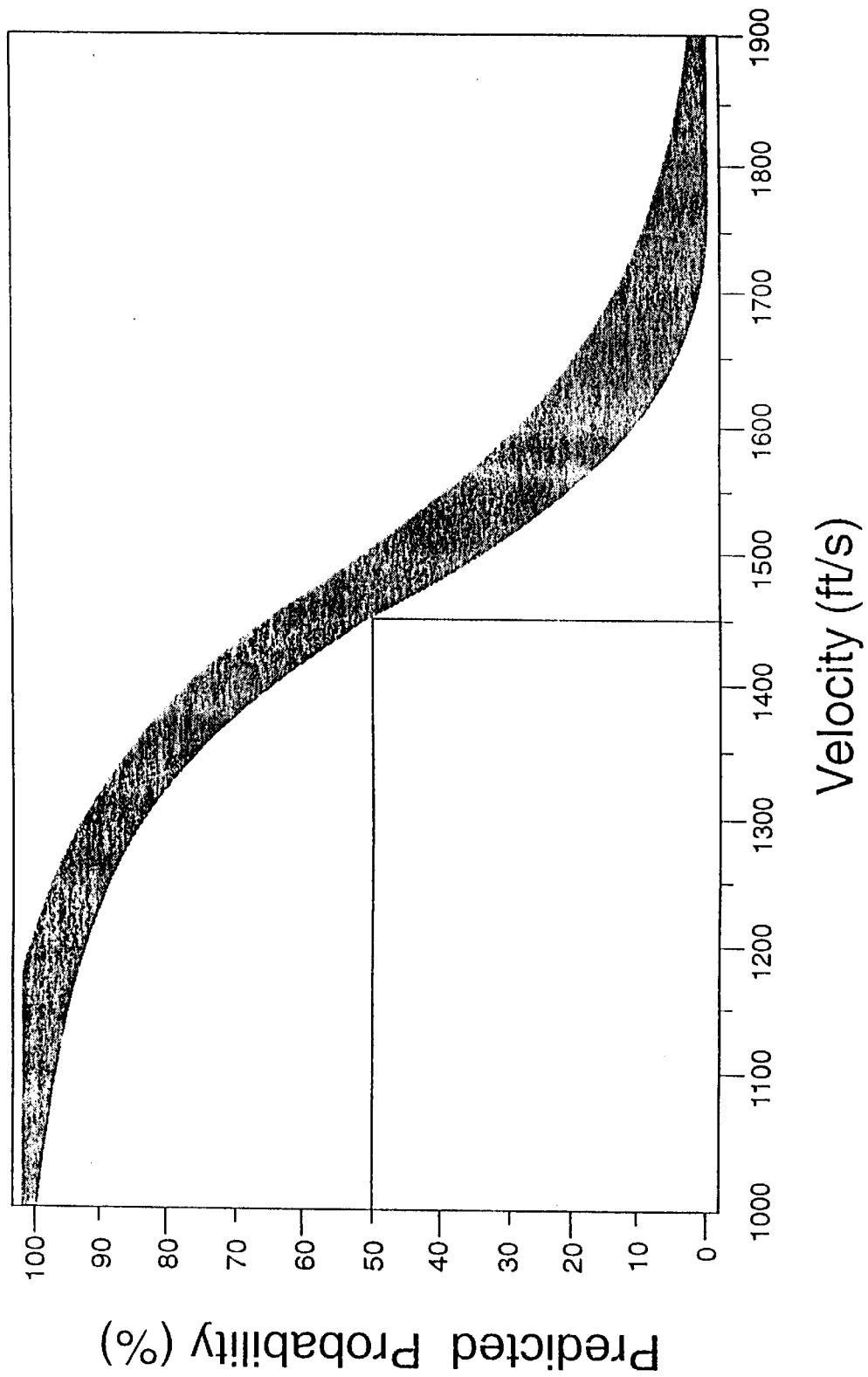
FIG. 9 is a table showing estimated stopping ability of a prior art "Spectra-Shield" polyethylene fabric.

Referring to FIG. 9, the graph illustrates that at the 50% predicted probability level a prior art "Spectra-Shield" fabric will stop a 9 mm round of ammunition traveling at 1450 ft/sec.

Figure 10:
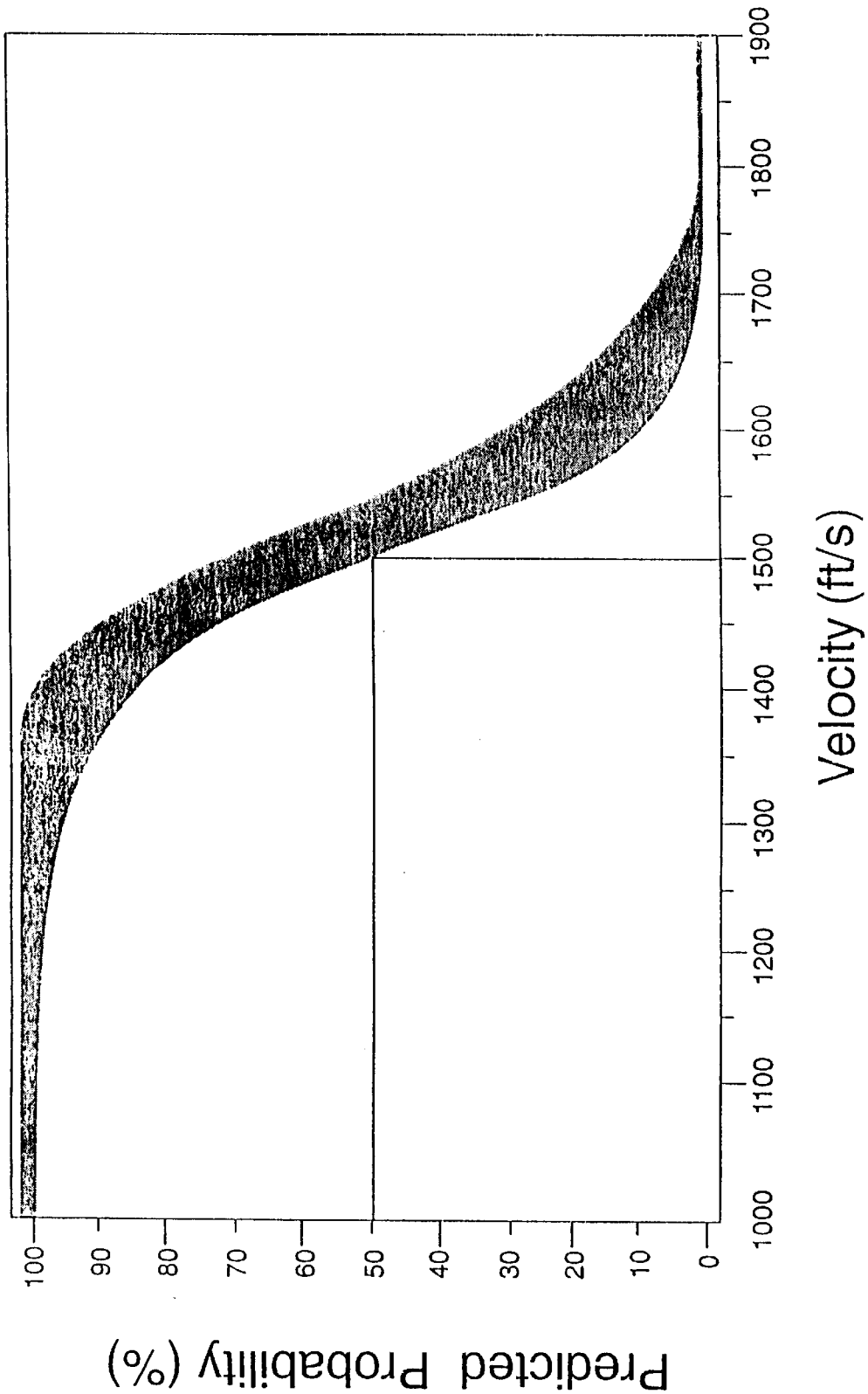
FIG. 10 is a table showing estimated stopping ability of a aramid fiber ("Kevlar") laminate structure according to a preferred embodiment of the invention.

In contrast, as is shown in FIG. 10, a "Kevlar" panel constructed in accordance with an embodiment of the invention will stop a round of 9 mm ammunition traveling at 1500 ft/sec 50 percent of the time. Furthermore, the steeper slope of the graph indicates that at lower velocities, the probability of the round be stopped by the fabric is further improved over the prior art. In addition, the lighter weight of the inventive laminate structure 25, its relative ease of construction and assembly provide further advantages.

Figure 13:
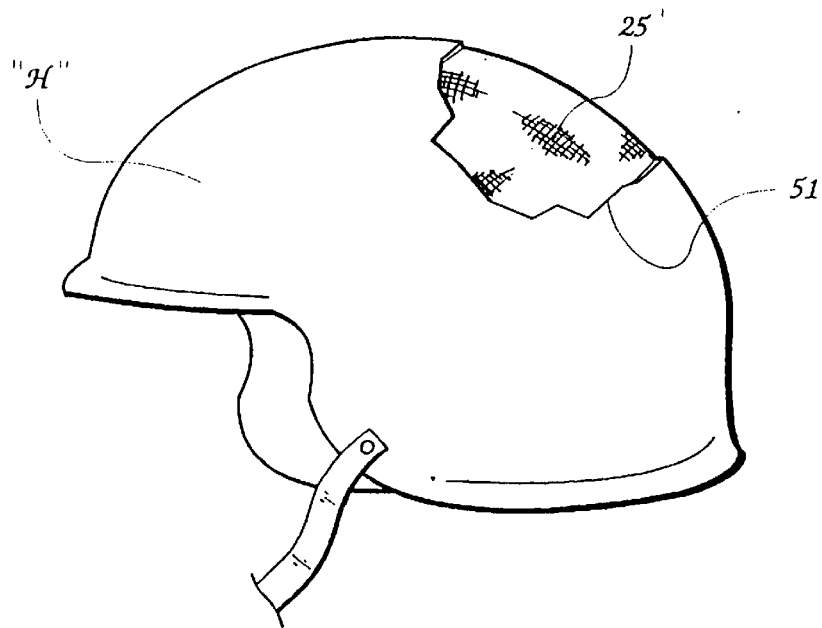
FIG. 13 is a perspective view of a military helmet with a top surface broken away to illustrate elements of the ballistic resistant composite.

A ballistic resistant composite 50 incorporating a laminate structure 25', as described above, is illustrated in FIGS. 11–13. The composite 50 is especially adapted for hard-armor application in military equipment, such as helmets "H" (See FIG. 13), protective windshields, vessels, tanks and other land vehicles, aircraft, and the like. In other applications, the composite 50 may be formed into light weight hard-armor panels for use in protective vests and other ballistic resistant garments. Given the excellent ballistic characteristics of the laminate structure 25', as illustrated in the graph of FIG. 10, the overall thickness requirements and weight of the composite 50 are greatly reduced as compared to similar composites of the prior art.

In addition to the laminate structure 25', the composite 50 includes a relatively hard, rigid plate 51 formed of a material, such as ceramic tile, steel, aluminum, titanium, glass, or graphite. The composite 50 may further include a thermosetting plastic such as epoxy or silicone resins, a thermoplastic such as ABS, or an elastomer such as natural rubber. A typical laminated, ceramic armor plate may include a layer of ceramic material, such as boron carbide, a layer of reinforced glass fabric, and a layer of aramid fibers such as "Kevlar" manufactured by DuPont, "Twaron" manufactured by Akzo, "Technora" manufactured by Teijin, "Trevar" or "Vectran" manufactured and marketed by Hoechst Celanese, or a layer of PBO such as that manufactured by Toyobo under the trademark "Zylon". In another embodiment, the rigid plate 51 is formed of a thermosetting polymeric material, such as a cured polyester resin, reinforced with glass fibers. In still another embodiment, the rigid plate 51 includes a ceramic core with a layer of metal surrounding the core. Other suitable materials may be used in combination, or individually, to form the rigid plate 51.

Figures 11, 12:
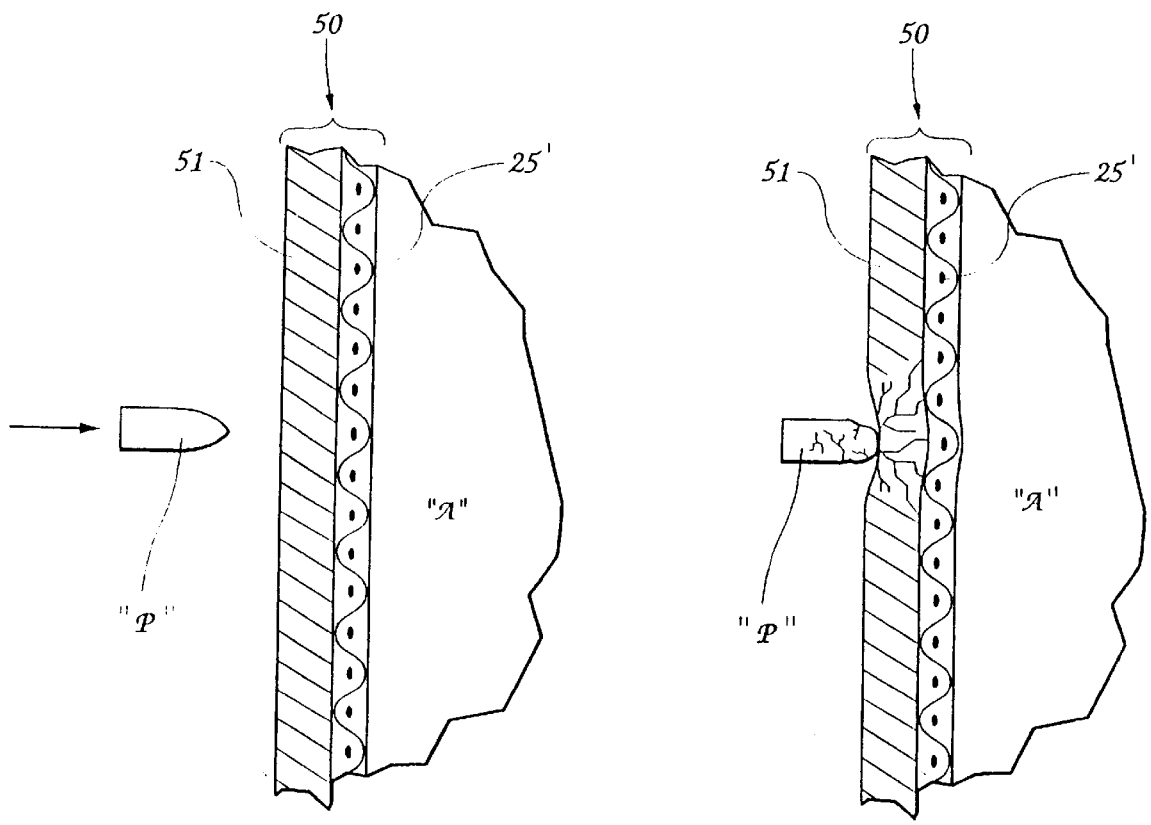
FIG. 11 is an enlarged, fragmentary cross-sectional view of a ballistic resistant composite according to one preferred embodiment of the invention, and showing the composite prior to impact by a projectile.
FIG. 12 is an enlarged, fragmentary cross-sectional view of the ballistic resistant composite illustrated in FIG. 11, and showing the composite immediately after impact by a projectile.

As indicated in FIGS. 11 and 12, the rigid plate 51 of the composite 50 faces the expected direction of the incoming projectile "P", and provides an initial impact barrier for shielding a protected area "A" from the projection "P" and resulting fragments. One or more layers of the laminate structure 25' are preferably adhered to a back surface of the rigid plate 51 using an adhesive, such as any suitable glue. The laminate structure 25' may alternatively be supported near or adjacent to the rigid plate 51 without being directly bonded thereto.

As shown in FIG. 12, upon impact of the projectile "P", any fragments of the projectile "P" and of the rigid plate 51 are captured by the laminate structure 25'. In many instances, this essentially negates any secondary damage typically caused by the projectile "P". According to other ballistic composites of the prior art, a relatively thick and heavy wall of steel or other hard-armor material is required to achieve such protection.

In addition, the laminate structure 25' may be incorporated with other materials before being applied to the rigid plate 51. According to one embodiment, one or more layers of the laminate structure 25' are bonded to, encapsulated by, or otherwise retained by support means (not shown), such as fiberglass, fabric, polymeric plastics and elastomers, and the like.

The rigid plate 51 may be flat or contoured depending upon the particular use application of the composite 50. The composite 50 may have any desired dimensions, and may be used in combination with any other ballistic resistant article.

In yet another preferred embodiment of the invention, particularly applicable when forming wide layers of laminate, such as between 12 and 60 inch widths, one or more fill fibers may be woven or stitched into the arrayed fiber bundles prior to forming the laminate structure in order to maintain the unidirectional orientation and structural integrity of the fibers during handling and lamination. The fill fibers may be any commercially available fiber which may or may not be a high performance fiber. The fill fibers may be monofilament, multi-filament, bi-component filament, ribbon, or strips.

A high performance fiber laminate structure, ballistic panel, garment including a high performance ballistic panel, a method of constructing a high performance fiber laminate structure, and ballistic resistant composite for hard-armor application is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A ballistic laminate structure in sheet form, comprising:
   (a) a first array of high performance, unidirectionally-oriented fiber bundles having a tensile strength greater than 7 grams per denier;
   (b) a second array of high performance, unidirectionally-oriented fiber bundles having a tensile strength greater than 7 grams per denier, and being cross-plied at an angle to said first array of fiber bundles; and
   (c) a polymeric film residing between said first and second cross-plied arrays of fiber bundles to adhere said first and second arrays of fiber bundles together without substantial penetration of said film into said fiber bundles.

2. A ballistic laminate structure according to claim 1, wherein the first array of fiber bundles is cross-plied at an angle of 90 degrees to the second array of fiber bundles.

3. A ballistic laminate structure according to claim 1, wherein said polymeric film comprises polyethylene film having a thickness of about 0.35 mils.

4. A ballistic laminate structure according to claim 1, wherein the percentage by weight of the high performance fibers in the ballistic laminate structure is at least 80 percent of the total weight of the ballistic laminate structure.

5. A ballistic laminate structure according to claim 1, wherein said first and second arrays of high performance, unidirectionally-oriented fiber bundles comprising fibers chosen from the group consisting of aramid fiber, polyolefin, vinylon, and liquid crystal polymer-based fiber.

6. A ballistic laminate structure in sheet form, comprising:
   (a) a first array of high performance, unidirectionally-oriented fiber bundles having a tensile strength greater than 7 grams per denier;
   (b) a second array of high performance, unidirectionally-oriented fiber bundles having a tensile strength greater than 7 grams per denier, and being cross-plied at an angle to said first array of fiber bundles; and
   (c) first and second polymeric films bonded to respective outside surfaces of said first and second cross-plied arrays of fiber bundles without substantial penetration of said film into said fiber bundles or through the laminate structure from one side to the other, whereby a sufficient amount of film resides between the first and second arrays of fiber bundles to adhere the first and second arrays of fiber bundles together in the absence of additional adhesives or bonding agents.

7. A ballistic laminate structure according to claim 6, wherein the first array of fiber bundles is cross-plied at an angle of 90 degrees to the second array of fiber bundles.

8. A ballistic laminate structure according to claim 6, wherein said first and second polymeric films comprise polyethylene film having a thickness of about 0.35 mils.

9. A ballistic laminate structure according to claim 6, wherein the percentage by weight of the high performance fibers in the ballistic laminate structure is at least 80 percent of the total weight of the ballistic laminate structure.

10. A ballistic laminate structure according to claim 6, wherein said first and second arrays of high performance, unidirectionally-oriented fiber bundles comprising fibers chosen from the group consisting of aramid fiber, polyolefin, vinylon, and liquid crystal polymer-based fiber.

11. A ballistic laminate structure in sheet form, comprising:

(a) a first array of high performance, unidirectionally-oriented fiber bundles having a tensile strength greater than 7 grams per denier;

(b) a second array of high performance, unidirectionally-oriented fiber bundles having a tensile strength greater than 7 grams per denier, and being cross-plied at an angle to said first array of fiber bundles;

(c) said first and second arrays of fiber bundles comprising fibers chosen from the group consisting of aramid fiber, polyolefin, vinylon, and liquid crystal polymer-based fiber; and (d) first and second thermoplastic films bonded to respective outside surfaces of said first and second cross-plied arrays of fiber bundles without substantial penetration of said films into said fiber bundles or through the laminate structure from one side to the other, whereby a sufficient amount of film resides between the first and second arrays of fiber bundles to adhere the first and second arrays of fiber bundles together in the absence of additional adhesives or bonding agents.

* * * * *